Aug. 6, 1963   L. M. SHOWERS, JR   3,099,928
ANTI-SKID CHAIN OPERATING DEVICE
Filed Feb. 15, 1962

Lewis M. Showers Jr.
INVENTOR.

BY

3,099,928
ANTI-SKID CHAIN OPERATING DEVICE
Lewis M. Showers, Jr., Delaware County, Pa.
(104 E. Essex Ave., Lansdowne, Pa.)
Filed Feb. 15, 1962, Ser. No. 173,447
1 Claim. (Cl. 81—15.8)

The purpose of this invention is to provide a better means of applying and removing anti-skid chains for vehicles without the need for jacking or being required to reach to the inside fastener when connection is made.

One object of this invention is to enable the fastening of the ends of the inside side chain from the outside of the wheel.

It is a further object of this invention to provide for the temporary holding of the outside side chain until the wheel is advanced onto the cross chains thus enabling the fastening of the outside side chain.

It is a further object of this invention to enable the release of the inside side chain, with one hand, by the operation of a small trigger.

Other advantages will be apparent from the following description:

Figure 1:
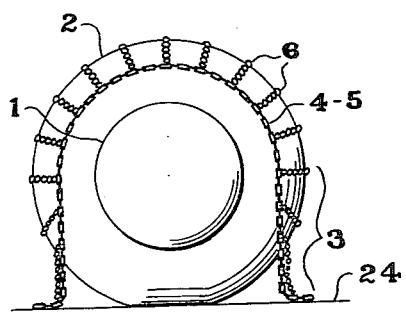
FIGURE 1 illustrates the outside of a wheel and tire under a normal load with an anti-skid chain draped over the tire.

Referring to the drawings, FIG. 1 illustrates a wheel 1 and a tire 2 which are so common as to require no description and henceforth will be referred to as wheel 1. Draped over wheel 1 are tire chains 3 composed of the usual inside side chain 4 (hidden), outside side chain 5 and a plurality of cross chains 6. The unusual and novel construction of chains is confined to the type of inside side chain end link and end fastener.

Figure 5:
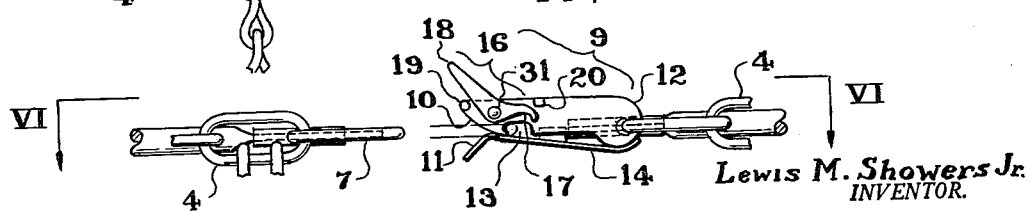
FIGURE 5 is an enlarged view taken along lines V—V of FIGURE 3 with chain ends disengaged.

The one end of the inside side chain 4 (FIGS. 3, 5 and 6) termintes with a special link 7. Attached to and extending parallel along the side of link 7 is a tang 8 (FIG. 6) adapted to engage a matching socket 29 which will be disclosed later.

Figure 6:
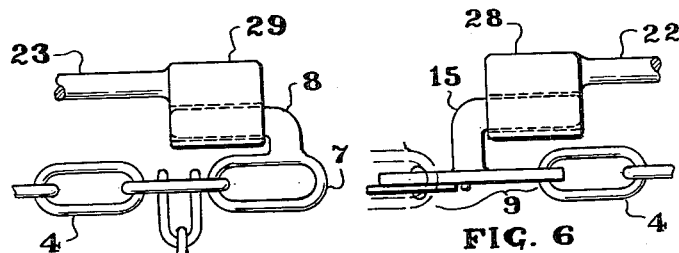
FIGURE 6 is a view taken along lines VI—VI of FIGURE 5.
Figure 6:
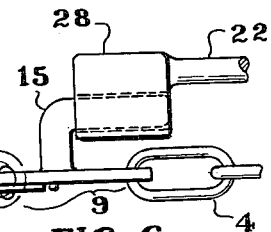

The other end of the inside side chain 4 (FIGS. 3, 5 and 6) terminates with a snap fastener 9. The approach surfaces 10 of the main body 12 (FIG. 5) and 11 of the link retainer 14 are formed to guide link 7 into engagement in link slot 13. Link retainer 14 is formed of suitable spring material capable of deflecting sufficiently to admit link 7 into slot 13 and return to its original form. Attached to and extending parallel along the side of link retainer 14 is a tang 15 (FIG. 6). Tang 15 is identical to tang 8 and is adapted to engage matching socket 28 which will be disclosed later.

Pivotally mounted at 31 on an axis perpendicular to the side of main body 12 (FIG. 5) is a release trigger 16.

The cam surface 17 on release trigger 16, adjacent to slot 13, is formed to force link 7 downward and outward from the engaged to the disengaged condition when arm 18 of release trigger 16 is swung thru an arc between stop 19 and stop 20 on main fastener body 12, thus releasing the ends of inside side chain 4.

To convey inside side chain special end link 7 into engagement with inside side chain snap fastener 9 (FIG. 3) a tong shaped closing device 21 is employed. Closing device 21 is composed of two jaws 22 and 23 which circumvent the wheel 1 at an elevation from the road surface 24 (FIG. 1), tangent to the inside side chain radius. Jaws 22 and 23 (FIG. 3) are pivotally and demountably attached at fulcrum 25 (FIGS. 3 and 4) with handles 26 and 27 (FIG. 3) respectively extending beyond fulcrum 25. Jaws 22 and 23 terminates with sockets 28 and 29 respectively which are adapted to receive tangs 8 and 15.

It will be readily understood that closing device 21 is so aligned and proportioned that special link 7 and snap fastener 9 will approach each other in a reasonably close alignment when under the influence of closing device 21.

Figure 2:
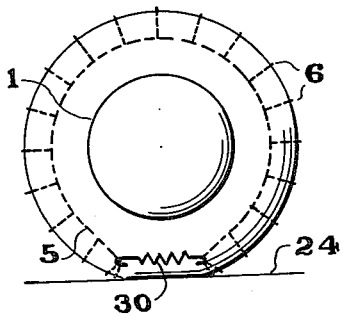
FIGURE 2 is the same as FIGURE 1 with the inside side chain fastened (not illustrated) and the outside side chain held in position ready for advancement of the wheel onto the cross chains.

The temporary outside side chain stretcher 30 (FIG. 2) is preferably a double hook coil tension spring and is used to hold outside side chain 5 while wheel 1 is rotated onto cross chains 6.

Figure 3:
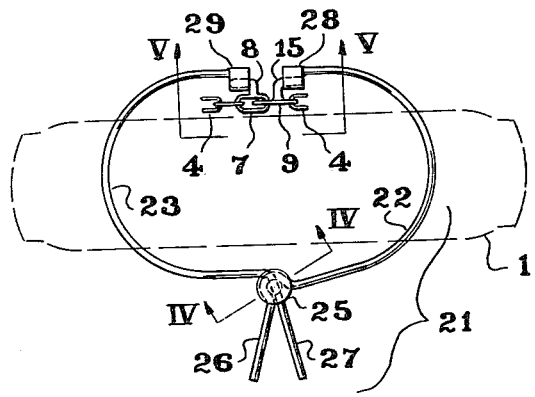
FIGURE 3 shows the closing device after securing the ends of the inside side chain.
Figure 4:
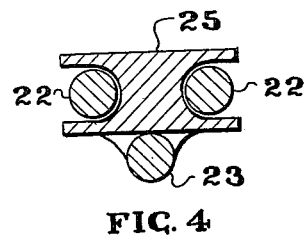
FIGURE 4 is an enlarged cross section taken along lines IV—IV of FIGURE 3.

When applying anti-skid chains to a vehicle wheel, the chains are first draped over wheel 1 (FIG. 1) with inside side chain 4 (FIG. 3) on the inside of wheel 1. Special link 7 is then brought to the outside of wheel 1 and tang 8 inserted in socket 29. Snap fastener 9 is then brought to the outside of wheel 1 and tang 15 inserted in socket 28. Jaws 22 and 23 are then hooked around wheel 1 near the road surface and engaged at fulcrum 25 (FIGS. 3 and 4). Squeezing the handles 26 and 27 (FIG. 3) in a pincer action closes link 7 and snap fastener 9 thus connecting the ends of inside side chain 4. The closing device 21 is then removed.

Outside side chain stretcher 30 (FIG. 2) is then applied as close to the ends of outside side chain 5 as tire contact with the road surface 24 will permit. Wheel 1 is then rolled onto cross chains 6, outside side chain stretcher 30 removed and ends of outside side chain 5 secured.

When it becomes desirable to remove anti-skid chains, the outside side chain 5 is disconnected in the usual manner. The hand is then passed around the tread of wheel 1 at the same location, pulling trigger 16 thus releasing the inside side chain 4. Dropping the chains to the road surface 24 and rolling wheel 1 off chains complete the removal.

While this invention has been described with particular reference to the construction shown in the drawing and while various changes may be made in the construction, it shall be understood that such changes shall be within the spirit and scope of the present invention as defined by the appended claim.

Having thus described my invention I claim:

A tire chain tool for connecting the ends of the inner circumferential loop of a tire chain having snap latch interlocking means at said ends and having also tool-engaging tangs at said ends which extend parallel to said chain and rearwardly from the ends thereof; said tool comprising a pair of crossed pivotally and separably interconnected members, each of said members having an arcuate jaw portion at one side of the pivot and a handle portion on the other side, said arcuate jaw portions having their concave sides facing each other and having their end portions provided with opposing tang-receiving sockets, whereby the tangs on the end portions of the inner circumferential loop of a draped tire chain may be inserted into the sockets of the separated tool members in front of the tire, then moved behind the inner side of the tire adjacent the road surface, the tool members may be pivotally interconnected in front of the tire and the handle portions may be actuated in front of the tire to guide the ends of the tire chain on the inner side of the tire into interlocking engagement.

References Cited in the file of this patent

UNITED STATES PATENTS

| | | |
|---|---|---|
| 2,707,411 | St. Pierre | May 3, 1955 |
| 2,743,754 | Maresh | May 1, 1956 |
| 2,759,384 | Boulton | Aug. 21, 1956 |
| 2,762,412 | Mank | Sept. 11, 1956 |